(12) United States Patent
Lal et al.

(10) Patent No.: US 10,035,874 B2
(45) Date of Patent: Jul. 31, 2018

(54) EPOXIDE-BASED COMPOSITION

(71) Applicant: EVONIK DEGUSSA GMBH, Essen (DE)

(72) Inventors: Gauri Sankar Lal, Whitehall, PA (US); Stephen Michael Boyce, Bath, PA (US); Dilipkumar Nandlal Shah, Wescosville, PA (US); Pritesh G. Patel, Breinigsville, PA (US)

(73) Assignee: Evonik Degussa GmbH, Essen (DE)

( * ) Notice: Subject to any disclaimer, the term of this patent is extended or adjusted under 35 U.S.C. 154(b) by 244 days.

(21) Appl. No.: 14/797,378

(22) Filed: Jul. 13, 2015

(65) Prior Publication Data
US 2016/0017087 A1    Jan. 21, 2016

Related U.S. Application Data
(60) Provisional application No. 62/025,132, filed on Jul. 16, 2014.

(51) Int. Cl.
| | | |
|---|---|---|
| *C08G 59/50* | (2006.01) | |
| *C08G 59/42* | (2006.01) | |
| *C08G 59/22* | (2006.01) | |
| *F16L 55/162* | (2006.01) | |
| *B05D 3/02* | (2006.01) | |
| *C09D 163/00* | (2006.01) | |
| *C08G 59/24* | (2006.01) | |
| *B05D 7/22* | (2006.01) | |

(52) U.S. Cl.
CPC ......... *C08G 59/506* (2013.01); *B05D 3/0254* (2013.01); *B05D 7/225* (2013.01); *C08G 59/22* (2013.01); *C08G 59/245* (2013.01); *C08G 59/4207* (2013.01); *C08G 59/5026* (2013.01); *C09D 163/00* (2013.01); *F16L 55/162* (2013.01)

(58) Field of Classification Search
CPC ........................ C08G 59/4207; C08G 59/5026
See application file for complete search history.

(56) References Cited

U.S. PATENT DOCUMENTS

2010/0227981 A1 * 9/2010 Chiba ................... C08G 59/22
                                                                525/408

FOREIGN PATENT DOCUMENTS

| JP | 11292956 A | * | 10/1999 |
| JP | 11315135 A | * | 11/1999 |
| JP | 2005075915 A | * | 3/2005 |

OTHER PUBLICATIONS

Burton et al., "Huntsman: Epoxy Formulations Using Jeffamine Polyetheramines," Copyright Huntsman Corporation, pp. 1-103, (2005). (Year: 2005).*

* cited by examiner

*Primary Examiner* — Randy P Gulakowski
*Assistant Examiner* — Ha S Nguyen
(74) *Attorney, Agent, or Firm* — Andrew H. Chung; Linda S. Li; Jason S. Ngui

(57) ABSTRACT

An epoxide based composition that can be cured at a temperature of less than about 70 C is disclosed. The composition is a liquid at ambient conditions and, therefore, can be used to rehabilitate the interior surfaces of pipelines. The epoxide-based composition comprises at least one epoxide component (component A) and at least one curing agent component (component B) wherein
  (A) the epoxide component comprises a phenyl glycidyl ether polyepoxide; and
  (B) the curing agent component comprises a mixture of two salt compounds formed, respectively, from an N-alkanol piperidine and a carboxylic acid bearing 7-12 carbon atoms, and N-cyclohexyl-N,N-dialkyl amine and a carboxylic acid bearing 7-12 carbon atoms.

17 Claims, No Drawings

EPOXIDE-BASED COMPOSITION

This Application claims the benefit of Application No. 62/025,132, filed on Jul. 16, 2014. The disclosure of Application No. 62/025,132 is hereby incorporated by reference.

TECHNICAL FIELD

The present invention relates to a curable epoxide-based composition. More specially, the present invention relates to a curable epoxide-based composition which is a liquid under ambient conditions and has a relatively long pot life.

BACKGROUND OF THE INVENTION

In some applications, it is preferred that the viscosity of an epoxy curing agent not change fundamentally for an extended period of time after combining an epoxide and a curing agent. Such a combination can facilitate the next step according to the intended use, such as coating, lamination, injection, potting or impregnation of composite compositions which contain reinforced or non-reinforced components.

When a combination of an epoxide component and a polyamine-based curing agent is left standing for a long period of time, a reaction can occur and the viscosity of the composition increases. Thus, the composition has a maximum time during which the composition can be used, such as coating, lamination, injection, potting or impregnation. The period of time beginning from combining the composition and ending when the viscosity increases of the combination is no longer capable of performing the desired working procedure, is referred to as "pot life", or working life. In many applications, a longer pot life is a desirable property to aid processing flexibility.

It is known in this art that a mixed composition comprising a solid epoxy component and similarly a solid curing agent component are known to have a long pot life (or shelf life). This is because the initiation of curing is depending on the thermal fusion of two components. Further, a large number of semi liquid-type compositions obtained by dispersing a solid curing agent component in a liquid epoxide component are known and also in this case, since the curing agent component is a solid, the initiation of curing is dependent on thermal fusion of the curing agent component or mixing of two components due to mutual dissolution.

However, compositions containing solids have a drawback ascribable to the fact that at least one component is a solid. More specifically, in the case of a composite material, for example, a fiber reinforced composite comprising resin binders and fibers, the resin binder needs to penetrate into a fiber bundle, but when a solid component is used, a filtration phenomenon by the fiber occurs thereby causing separation between binder components and, as a result, a curing failure may be brought about. The same applies to the case of using a woven fabric or the like for the reinforcing material. For this reason, a liquid epoxide component and a liquid curing agent component would be desirable as a material capable of overcoming such a problem.

Another drawback in known compositions is that these compositions have a relatively short pot life. Generally, in a composition having a short pot life, a reaction abruptly occurs and the time to reach the cured state is short, whereas in a composition having a long pot life, the time necessary for curing is long. As a result, there is a need in this art for a liquid epoxide-based composition having as long a pot life as several tens of hours, being curable at relatively low temperature range (moderate temperature range) of 100° C. or less.

Such a composition comprising an epoxide and curing agent both being a liquid would enable paint coating for the purpose of protecting the inner surface of a water supply pipe, a sewer pipe, gas supply pipes or other industrial liquid transport pipes, or other outdoor construction for the purpose of, for example, laminating a protective lining or the like serving also as pipe reinforcement, by using an organic or in organic fiber or film or the like. In particular, the composition would be useful for rehabilitation work or the like of the inner surface of a pipe, which is performed without digging up fluid transport pipes already buried under the ground.

The rehabilitation work of these buried pipes is usually performed by setting the section between a manhole and a manhole as one unit of work. The working procedure comprises, in sequence, mechanical removal of old coating remaining inside of the pipe, washing with water, drying, coating of a resin component, spreading of inverted fibers or films by using hot air or hot water, and maintenance of a given temperature with hot water or hot air. When conducting a rehabilitation using a fiber or a film, in the case of a short work selection, coating of a binder or primer onto the inside of the pipe and lamination by spreading of inverted cylindrical fiber or films may be performed even if the pot life of the composition is short, but in the case of a long work selection, a long time over several tens of hours is necessary.

For rehabilitation of pipes used for transporting water or other fluid media, there is a need in this art for composite system which can be applied to the inside steel or concrete wall of such pipes. Known compositions cannot provide appropriate working time (pot life), cause odor or toxicity issues from employed chemicals (e.g., mercaptan, acrylonitrile, and isocyanates) in binders or cannot be applied to multi layer and non-transparent films/composites due to the curing process (e.g. UV cure).

US Patent Pub No 2010/0227981A1 discloses a composition comprising at least one phenyl glycidyl ether polyepoxide having at least one epoxide group of oxirane structure in the molecule; and a curing agent component comprising one salt compound formed from an N-alkanol piperidine and a carboxylic acid which can be used in the rehabilitation of water pipes at a cure temperature of less than 100° C. and specifically at 80° C.

The disclosure of the previously identified patents and patent applications are hereby incorporated by reference.

BRIEF SUMMARY OF THE INVENTION

The instant invention solves problems associated with known compositions by providing a composition that can be cured at a temperature of less than about 80° C. (e.g., 65° C., about 60° C. to about 70° C. and in some cases about 62° C. to about 65° C. for a period of less than about 4 hours). By cured it is meant that when the composition containing the epoxy resin and curing agent or hardener is exposed to an elevated temperature for a sufficient period of time, the composition begins a chemical reaction that transforms the combined liquid ingredients into a solid. The time it takes for this transformation is the cure time. As the liquid composition cures, the epoxy passes from the liquid state, through a gel state, before it reaches a solid state. A complete cure is evidenced by a non-sticky or tacky product.

The inventive composition is a liquid at ambient conditions (e.g., atmospheric pressure and a temperature of 25°

C.), and, therefore, can be used to treat a wide range of surfaces including. to concrete, steel, fiber glass and PVC substrates to rehabilitate the interior surfaces of pipelines (e.g., at a temperature of about 70° C. an uncured composition of the invention has a viscosity of about 1000 cP to about 2000 cP, about 1500 to about 2000 and in some cases about 1000 to about 1200 cps).

The epoxide-based composition according to the present invention comprises at least one epoxide component (component A) and at least one curing agent component (component B). In one aspect of the invention the composition comprises:

(A) An epoxide component comprising a phenyl glycidyl ether polyepoxide; and (B) A curing agent component comprising a mixture of two salt compounds formed, respectively, from an N-alkanol piperidine and a carboxylic acid bearing 6-12 carbon atoms, and N-cyclohexyl-N,N-dialkyl amine and a carboxylic acid bearing 6-12 carbon atoms.

In another aspect of the invention, the inventive curable epoxide-based composition has an advantage that, even after the mixing of the epoxy component and the curing agent component, the composition can maintain an uncured state over a long period of time, to thereby enable the composition to maintain a workable viscosity until the use of the composition in the next step (or operation). For example, the inventive composition can have a pot life of about 20 to about 30 hours at a temperature of about 25° C.

The composition can comprise at least one diluent such as a mono glycidyl ethers to modify the viscosity for ease of processing as desired. Such diluents include at least one of butyl glycidylether, phenyl glycidyl ether, and dodecyl glycidyl ether.

In one aspect of the invention, the curing agent B may be combined with a co-curing agent (<50 wt % relative to B) of a hindered polyether amine if desired to increase cross linking density and mechanical strength of the cured product if desired. In addition an epoxy cure accelerator (<10 wt % relative to component B) may be blended into component B to further decrease cure time if needed without compromising latency.

In a further aspect, the present epoxide-based composition ensures that an uncured condition after mixing an epoxide component and a curing agent component can be maintained for a long period of time, a subsequent process such as coating, sandwiching, impregnation and injection can be performed over a relatively long period of time (in comparison to conventional systems), and furthermore, later curing can be performed even at a relatively low temperature of 80° C. or less within 4 h. This aspect of the invention is useful for rehabilitation and repair work of buried pipes.

In one aspect, the present invention provides an epoxide-based composition which ensures that flowable (non-gelled liquid) condition is maintained for a long period (e.g., a period up to 24 hours) after the mixing of an epoxide compound and a curing component, and that the viscosity of the mixture within 16 hours does not exceed 20000 cP thereby facilitating the subsequent application and spreading of the composition. The present invention also provides an epoxide-based composition such that it can be cured by using a heat medium such as hot water or hot air or other heating devices in the moderate temperature range (e.g., about 60 to about 80 C).

The present invention provides a composition having up to 16 hours pot life (viscosity not greater than 20,000 cP) at 25° C. while maintaining a fluid condition, cures under 80° C., and provides good adhesion to concrete, steel fiber glass and PVC substrates.

In comparison to known compositions, the inventive composition obtains synergistic results by employing two salts that are obtained from carboxylic acids having a chain length of 6-12 carbon atoms. These salts permit the inventive composition to cure at relatively low temperatures (e.g., about 60 to about 70° C.) whereas known compositions require a curing temperature of 80-150° C. Consequently the inventive composition improves the utility of epoxide based compositions containing the inventive composition; especially when used for applications in which high temperature is difficult to obtain. In one aspect of the invention, the epoxide based composition is applied onto an interior surface of a pipe in order to repair or remediate the pipe. An example of an interior pipe surface remediation of an underground pipe (also known as cured in place pipe repair) is described by Mohammed Najafi, and Sanjov Gokhale, P, *Trenchless Technology* (New York: McGraw Hill, 2004), p. 295-311. Available from Water Environment Federation at http://www.e-wef.org/timssnet/static/OM/WPM404.htm; the disclosure of which is hereby incorporated by reference. The relatively low curing temperature of the epoxide based compositions enable curing the compositions with a heat source (e.g., hot water or steam) that is located remotely from the epoxide based compositions. Although hot water or steam can cool to a temperature of less than 70° C. as it travels to the location of the composition to be cured, such temperatures are adequate to cure the inventive compositions.

One aspect of the invention relates to an epoxide-based composition, comprising (A) an epoxide component comprising at least one phenyl glycidyl ether polyepoxide having at least two epoxide group of oxirane structure in the molecule.

(B) A curing agent component comprising a mixture of a first salt comprising a salt of an N-alkanol piperidine and at least one carboxylic acid bearing 6-12 carbon atoms and a second salt comprising a salt of N-cyclohexyl-N,N-dialkyl amine with a carboxylic acid bearing 6-12 carbon atoms.

Another aspect of the invention relates to the foregoing aspect wherein the amount of the curing agent of component (B) is from about 1 to about 50 wt parts per 100 wt parts of the epoxide component (A).

Another aspect of the invention relates to the foregoing aspects wherein the salt of N-alkanolpiperidine in the mixture ranges from 20-80 wt %.

A further aspect of the invention relates to the foregoing aspects wherein the epoxide component (A) further comprises a epoxide compound other than a phenyl glycidyl ether polyepoxide.

Another aspect of the invention relates to the foregoing aspects wherein the epoxide compound is at least one compound selected from the group consisting of glycidyl ethers, glycidyl esters and glycidyl amines.

Another aspect of the invention relates to the foregoing aspects wherein the N-alkanol piperidine is selected from the group consisting of N-piperidine ethanol and N-piperidine propanol and the N-cyclohexyl-N,N-dialkyl amine is selected from a group N-cyclohexyl-N,N-dimethylamine consisting of N-cyclohexyl-N,N-dimethylamine, and N-cyclohexyl-N,N-dipropylamine.

DETAILED DESCRIPTION OF THE INVENTION

The epoxide-based composition according to the present invention can provide a flowable condition that is maintained for long period (e.g. a viscosity less than 20,000 cP at a temperature of 25° C. period up to 24 hours) after the mixing of an epoxide compound and a curing agent component, and that the viscosity within 16 hours does not exceed 20,000 cP.

Further, the epoxide-based composition can be cured by using a heat medium such as hot water or hot air in a moderate temperature range (e.g., cured after exposure to a temperature of about 60° C. to about 70° C. for a period of <about 4 hrs). Therefore, the epoxide-based composition according to the present invention can be used to treat a wide range of surfaces including concrete, steel fiber glass and PVC substrates and, in particular, rehabilitation work of buried pipes as a conduit for various fluids.

Further, the epoxide-based composition according to the present invention is effective for rehabilitation work performed without digging up buried pipes.

Herein below, the present invention will be described in detail. In the following description, "%" and "part(s)" representing a quantitative proportion or ratio are those based on mass, unless otherwise noted specifically.

The epoxide based composition according to the present invention comprises an epoxide component (component A) and a curing agent component (component B) in which the epoxide component comprises a phenyl glycidyl ether-based polyepoxide; and a curing agent component comprising a mixture of two salt compounds formed, respectively, from the tertiary amine N-alkanol piperidine and a carboxylic acid bearing 6-12 carbon atoms, and the tertiary amine N-cyclohexyl-N,N-dialkyl amine with a carboxylic acid bearing 6-12 carbon atoms. The amount of epoxide component can range from about 70 to less than 100, about 85 to about 60 and in some cases about 80 to about 90 wt. % of the epoxide based composition. The curing agent component can range from about 15 to about 30, about 40 to about 20 and in some cases about 20 to about 10 wt. % of the epoxide based composition.

The epoxide component and the curing agent component can be combined by using any suitable equipment and methods such as mixing, stirring, pumping, among other equipment and methods known in this art.

The salts of the curing agent can be obtained by reacting the amine with the carboxylic acid at 25° C. for 1-6 h at <80° C. The molar ratio of amine to carboxylic acid is about 1:1.

The epoxide-based composition according to the present invention may have the following Properties (1)-(3).

Property 1

Under conditions used in the examples, the viscosity of the epoxide-based composition according to the present invention within 16 hours is <20,000 cP. Viscosity is determined by using a Brookfield viscometer (Brookfield HT-2DB). A disposable aluminum spindle (Brookfield SC4-27D) is inserted into the chamber containing curing agent mixture and the viscometer (Brookfield RVDV-II+Pro) is started to collect data points at the rate of 1 per minute in accordance with standard testing procedures.

Property 2

The epoxy-based compositions according to the present invention can be curedand hard to the touch without stickiness at a temperature of about <70° C. within a period of about 4 h. The curing temperature and time are inversely related in that given a longer period of time the curing temperature can be lowered. The curing temperature can range from about 60° C. to about 70° C., about 65° C. to about 70° C. and in some cases about 60° C. to about 65° C. The curing time can range from about 1 h to about 4 h, about 2 h to about 4 h and in some cases about 3 h to about 4 h. If needed, the extent of cure of the resin can be determined by DSC (differential scanning calorimetry).

Property 3

The epoxy-based compositions according to the present invention can be cured and hard to the touch without stickiness at <70° C. within 4 h in the presence of at least 1 wt % water. The inventive compositions can be cured in an environment containing about 2% to about 5%, about 3% to about 5% and in some cases about 4% to about 8% water. For example, heated air or a steam containing atmosphere can be used curing the inventive composition.

The epoxide (component (A) of the composition of the present invention comprises a phenyl glycidyl ether epoxide having a plurality of oxirane structures in the molecule and having reactivity with an amine, and examples thereof may comprise the following: Aromatic diglycidyl ethers generated by reacting diphenols such as bisphenol A, bisphenol F, bisphenol AD, tetramethylbisphenol A, tetramethyl bisphenol F or biphenyl, with epichlorohydrin; glycidyl ether obtained by reacting a novolak such as phenol novolak, cresol novolak, ethylphenol novolak, propylphenol novolak, butylphenol novolak, pentylphenol novolak, octylphenol novolak or nonylphenol novolak, with epichlorohydrin; and glycidyl ethers obtained by reacting a polyhydric phenol such as catechol, resorcin, trihydroxybiphenyl, dihydroxybenzophenone, bisresorcinol, hydroquinone, tris (hydroxyphenyl) methane, tetrakis(hydroxyphenyl) ethane or bisphenol, with epichlorohydrin and mixtures thereof.

Among the epoxy compounds above, desirable results can be achieved by using diglycidyl ethers of bisphenol A and bisphenol F.

Examples of the epoxides which can be used in combination with the phenyl glycidyl ether epoxides may comprise at least one member selected from at least one of the groups of:

(1) polyglycidyl ethers generated by reacting an aliphatic polyhydric alcohol such as glycol, neopentylalcohol, ethyleneglycol, propyleneglycol, tetramethyleneglycol, hexaneglycol, polyethyleneglycol or polypropylene glycol, with epichlorohydrin;

(2) glycidyl ether esters generated by reacting a hydroxycarboxylic acid such as p-hydroxybenzoic acid or β-hydroxynaphthoic acid, with epichlorohydrin;

(3) polyglycidyl ester generated by reacting a polycarboxylic acid such as phthalic acid, methylphthalic acid, isophtalic acid, terephthalic acid, tetrahydroxyphthalic acid, hexahydroxyphthalic acid, endomethylenetetrahydrophthalic acid, endomethylenehexahydroxydrophthalic acid, trimellitic acid, a dimer acid or a polymerized fatty acid, with epichlorohydrin;

(4) diglycidylamino esters generated by reacting an aminobenzoic acid with epichlorohydrin; and (5) polyglycidylamines generated by reacting aniline, toluidine, m-xylyenediamine, 1,2-diaminocyclohexane, 1,2-diaminocyclohexane, 4,4-diaminodiphenyl ether, 4,4-diaminodiphenylmethane, 4,4-diaminodiphenylsulfone, hydantoin, an alkylhydantoin or cyanuric acid, with epichlorohydrin.

The curing agent component (component B) comprising the epoxide-based composition of the present invention comprises a mixture of at least two of the following salt compounds formed from: 1) the tertiary amine N-alkanol piperidine and a carboxylic acid bearing 6-12 carbon atoms; and 2) the tertiary amine N-cyclohexyl-N,N-dialkylamine with a carboxylic acid bearing 6-12 carbon atoms.

While any suitable tertiary amine or amines can be employed for making the foregoing salts, examples of suitable tertiary amines comprise N-ethanolpiperidine and N-cyclohexyl-N,N-dimethylamine, N-cyclohexyl-N,N-diethylamine N-cyclohexyl-N,N-dipropylamine, and N-cyclohexyl-N,N-dibutylamine.

The carboxylic acid of the tertiary amines salts as curing agent component of the present invention can comprise at least one monovalent organic carboxylic acid bearing 6-12 carbon atoms, and examples thereof may comprise the following hexanoic acid, heptanoic acid, 2-ethylhexanoic acid, octanoic acid, nonanoic acid decanoic acid, undecanoic acid, dodecanoic acid and mixtures thereof. The salts can be formed by reacting the amine with the carboxylic acid at 25° C. for about 1 to about 6 h at less than <80° C. The molar ratio of amine to carboxylic acid is about 1:1 and can range from about 0.8 mol eq to about 1.0 mol eq, about 0.9 mol eq. to about 1.0 mol eq and in some cases about 1.0 mol eq to about 1.1 mol eq.

Component B of the epoxide-based composition of the present invention can comprise a carboxylic acid equivalent of the component B is from about 0.8 to about 1.2, about 1.1 to about 1.2, and in some cases about 1.0 to about 1.1 equivalents per mole of an N-alkanol piperidine and N-cyclohexyl-N,N-dimethylamine.

The ratio between the epoxide component (A) and the curing agent component (B), the amount of the curing agent component (B) can range from about 1 to about 50 wt parts, or about 5 to about 20 wt parts or 10 about to about 30 parts, per 100 wt parts of the polyepoxide component (A). If the amount of the component B is less than the range above, a very long pot life after mixing of component (A) and component (B) may be expected, but the subsequent curing may take a long time, which is impracticable. On the contrary, if the curing agent component (B) is combined in excess of the range above, curing after mixing the component (A) and the component (B) may swiftly proceed, but the pot life necessary for operation may become short, which is normally impracticable.

Further, in the composition of the present invention, at least one of a plasticizer, a filler, a coloring agent, an extender, pigment, organic or inorganic fibers, a silicone, titanate or aluminum coupling agent for improving adhesion to the pipe body, a thixotropic agent, and the like may be used in combination, if desired. The amount of the foregoing can range from about 10 wt % to about 20 wt %, about 10 wt % to about 12 wt % and in some cases about 18 wt % to about 20 wt % of the epoxy based composition.

The composition may further comprise at least one diluent such as a mono glycidyl ethers to modify the viscosity for ease of processing as desired. Such diluents include butyl glycidylether, phenyl glycidyl ether, and dodecyl glycidyl ether. The amount of such diluent can comprise about 10 to about 20, about 10 to about 15 and in some cases about 15 to about 20 wt. % of the composition. The diluents can be included in the A and/or B component of the composition.

In one aspect of the invention, the composition is free or substantially free of mercaptan, acrylonitrile, and isocyanates. By free or substantially free of the foregoing it is meant that the composition contains less than about 0.25, less than about 0.1 and in some cases about 0 wt %.

In another aspect of the invention, the composition is free or substantially free of solids. By free or substantially free of solids, it is meant that the composition comprises less than about 0.25, less than about 0.1 and in some cases about 0 wt. % solids.

In another aspect of the invention, the curing agent B may be combined (e.g., <50 wt %, <30 wt. % and in some cases <20 wt. % relative to B) of at least one hindered polyether amine in order to increase cross linking density and mechanical strength of the cured product. Examples of suitable hindered polyether amines include at least one member selected from the group of polyoxypropylenediamine, M. Wt. ~230 (Jeffamine® D230), polyoxypropylenediamine, M. Wt. ~430 (Jeffamine D400) and polyoxypropylenetriamine, M. Wt. ~400 (Jeffamine T403). Alternatively or in addition to an epoxy cure accelerator (e.g., <10 wt %, <5 wt. % and in some cases <2 wt. % relative to component B) may be blended into component B to further decrease cure time if needed without compromising latency. Examples of suitable cure accelerators include imidazoles such as 1-methylimidazole, 2-methylimidazole and tertiary amine substituted phenols such as tris(dimethylaminomethyl)phenol, (Ancamine® K-54 available from Air Products) and dimethylaminomethyl phenol (Ancamine 1110).

The following Examples are provided to illustrate certain aspects of the instant inventions and shall not limit the scope of the claims appended hereto.

EXAMPLES

Example 1: General Procedure for Preparation of Curing Agents

The tertiary amine (1 mole) was charged into a 3-neck round bottom flask equipped with a overhead mechanical stirrer and nitrogen inlet and thermocouple. The acid (1 mole relative to amine) was added slowly to maintain the temperature at 25-30° C.

Example 2: Testing Procedure of Curing Agents with Epoxy Resin at 70° C.

20 g of the curing agent is mixed with 100 g of bis-phenol A diglycidyl ether (EPON 828) using a spatula in a 200 mL glass jar. Pucks are prepared from this mixture by transferring to a 2 oz. metal container, the curing agent and epoxy resin mixture (~5-7 g). Two pucks are prepared, one with and one without water. In the former a small amount of water is applied to one puck ~2 g. but not enough to completely cover the entire surface. The pucks are placed into 65° C. oven for 2 hrs. or until cured. The cure time and surface characteristics of the cooled pucks are noted, and tackiness, glassiness, and entrained air were determined by visual observation and hardness to touch.

Example 3: Latency of Amine Curatives 20 g of the curing agent is mixed with 100 g of bis-phenol A diglycidyl ether (EPON 828) using a spatula in a 200 mL glass jar. 15 g. of this material is transferred into a disposable aluminum chamber (Brookfield HT-2DB). A disposable aluminum spindle (Brookfield SC4-27D) is inserted into the chamber containing curing agent mixture and the Start viscometer (Brookfield RVDV-II+Pro) is stated to collect data points at the rate of 1 per minute. Pot-life is recorded as the time to reach 20,000 cP at 25° C. Complete Cure was determined by visual observation and hardness to touch.

| Curing agent (20 phr) | Pot-Life (Time to 20,000 cP) (hours) | Complete Cure at 70° C. in 3 h? yes or no |
|---|---|---|
| TOFA salt of 1-ethylpiperidine | 38 | No |
| TOFA salt of N-ethanolpiperidine | 45 | No |
| TOFA salt of 1,8-diazabicycloundecane(5.4.0)undec-7-ene (DBU) | 13 | No |
| 2-ethylhexanoic acid salt of 1,8-diazabicycloundecane(5.4.0)undec-7-ene (DBU) | 1 | No |
| 2-ethylhexanoic acid salt of N-ethanolpiperidine | 29 | No |
| 2-ethylhexanoic acid salt of N-cyclohexyl-N,N-dimethylamine | 13 h | No |
| Mixture of 2-ethylhexanoic acid salt of N-ethanolpiperidine and 2-ethylhexanoic acid salt of N-cyclohexyl-N,N-dimethylamine (40:60 w/w) | 22 h | yes |
| Mixture of 2-ethylhexanoic acid salt of N-ethanolpiperidine and 2-ethylhexanoic acid salt of N-cyclohexyl-N,N-dimethylamine (50:50 w/w) | 24 h | yes |
| Mixture of 2-ethylhexanoic acid salt of a N-ethanolpiperidine and 2-ethyhexanoic acid salt of N-cyclohexyl-N,N-dimethylamine (60:40) | 26 h | yes |
| TOFA salt of 4-methylmorpholine | 9 h | No |
| TOFA salt of tris(dimethylaminopropyl)amine | 3 | No |

Example 4: Cured in Place Pipe Simulated Application

To understand the applicability of the curing agent in the cured in place pipe (CIPP) application, the following experiment was conducted. The curing agent (100 g) (a mixture of the 2-ethylhexanoic acid salt of 1-piperidineethanol and the 2-ethylhexanoic acid salt of N-cyclohexyl-N,N-dimethylamine, 40/60 wt/wt) was mixed with standard DGEBA type liquid epoxy resin (500 g) having EEW=190 at ambient conditions. The mixed mass was enough to wet out a 4" diameter and a commercially available foot long cylindrical felt comprising commercially available-polyester fibers and polyethylene lining. The mixed mass was applied to the felt by manually pouring the mixed mass in the felt at one end and applying vacuum to the other end of the felt. This type of felt is commonly used for underground pipe rehabilitation.

The mixed mass was evenly applied to the interior of the felt and the felt was left alone at ambient temperature overnight to evaluate the product shelf stability. After 24 h, the felt appeared to be soft and that the mixed material was still tacky and the felt was soft enough to be processed further. The felt piece was then inverted in a PVC pipe in such a way that the wet layer of the felt adheres to an interior of the PVC pipe. The interior of the PVC pipe along with the felt was then baked at 65 C for 2 hours using hot water. After it cooled down, the pipe was cut in small pieces to evaluate the adhesion of the felt and PVC pipe. Adhesion was determined by manually-pulling the liner away from the host pipe. The adhesion between the felt and the PVC pipe was excellent. The cured epoxy composite (i.e., comprising a felt reinforcement embedded by an epoxy matrix) demonstrated acceptable flexural modulus (>300,000 psi) that is required by the industry. A cured epoxy composite of the invention can have a flexural modulus from about 300,000 to about 500,000, about 300,000 to about 400,000 and in some cases about 350,000 to about 450,000 psi. Flexural modulus was determined by ASTM D-790.

While the invention has been described with reference to certain aspects and embodiments, it will be understood by those skilled in the art that various combinations and changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular aspect or embodiment disclosed for carrying out this invention, but that the invention will include all aspects or embodiments falling within the scope of the appended claims.

We claim:

1. An epoxide-based composition, comprising
   (A) an epoxide component comprising at least one phenyl glycidyl ether polyepoxide having at least two epoxide group of oxirane structure in the molecule; and
   (B) a curing agent component comprising a mixture of (i) a first salt comprising a salt of an N-alkanol piperidine and at least one carboxylic acid bearing 6-12 carbon atoms and (ii) a second salt consisting of a salt of N-cyclohexyl-N,N-dialkyl amine and a monovalent organic carboxylic acid bearing 6-12 carbon atoms;
   wherein the salt of N-alkanol piperidine in the mixture ranges from 20-80 wt %.

2. The composition of claim 1 wherein the amount of the curing agent of component (B) is from about 1 to about 50 wt parts per 100 wt parts of the epoxide component (A).

3. The epoxide-based composition according to claim 1, wherein the epoxide component (A) further comprises an epoxide compound other than a phenyl glycidyl ether polyepoxide.

4. The epoxide-based composition according to claim 3, wherein the epoxide compound is at least one compound selected from the group consisting of glycidyl ethers, glycidyl esters and glycidyl amines.

5. The epoxide-based composition according to claim 1, wherein the N-alkanol piperidine is selected from the group consisting of N-piperidine ethanol and N-piperidine propanol and the N-cyclohexyl-N,N-dialkyl amine is selected from the group consisting of N-cyclohexyl-N,N-dimethylamine and N-cyclohexyl-N,N-dipropylamine.

6. The epoxide-based composition according to claim 1 further comprising at least one diluent selected from the group consisting of mono glycidyl ethers.

7. The epoxide-based composition according to claim 6 wherein the diluents comprises at least one member selected from the group consisting of butyl glycidyl ether, phenyl glycidyl ether, and dodecyl glycidyl ether.

8. The epoxide-based composition according to claim 1 further comprising at least one accelerator selected from the group consisting of imidazoles.

9. The epoxide-based composition of claim 8 wherein the imidzoles comprise at least one member selected from the group consisting of 1-methylimidazole, and 2-methylimidazole.

10. The epoxide-based composition according to claim 1 further comprising at least one accelerator selected from the group consisting of phenolic tertiary amine derivatives tris (dimethylaminomethyl)phenol, and dimethylaminomethylphenol.

11. A method for treating a substrate comprising applying the epoxide-based composition of claim 1 onto a substrate, heating the substrate to a temperature of less than about 80° C. and curing the composition.

12. The method of claim 11 wherein the substrate comprises an interior surface of a conduit or pipe.

13. The method of claim 12 wherein the surface comprises a fibrous material within the conduit or pipe.

14. A treated substrate made in accordance with the method of claim 11.

15. The method of claim 12 wherein the conduit or pipe is cured in place without digging or removing the pipe.

16. The method of claim 15 wherein treatment is applied using cured in place pipe (CIPP) technology.

17. The epoxide-based composition according to claim 1, further comprising at least one hindered polyether amine selected from the group consisting of polyoxypropylenediamine having a molecular weight of about 230, polyoxypropylenediamine having a molecular weight of about 430, and polyoxypropylenetriamine having a molecular weight of about 400.

* * * * *